United States Patent
Brandley et al.

(10) Patent No.: US 7,792,209 B2
(45) Date of Patent: Sep. 7, 2010

(54) DIGITAL DPSK DEMODULATION METHOD AND SYSTEM

(75) Inventors: Delbert E. Brandley, Gardner, KS (US); Showkat Osman, Overland Park, KS (US)

(73) Assignee: Honeywell International Inc., Morristown, NJ (US)

( * ) Notice: Subject to any disclaimer, the term of this patent is extended or adjusted under 35 U.S.C. 154(b) by 1176 days.

(21) Appl. No.: 11/245,631

(22) Filed: Oct. 6, 2005

(65) Prior Publication Data

US 2007/0080849 A1    Apr. 12, 2007

(51) Int. Cl.
*H04L 27/18* (2006.01)

(52) U.S. Cl. .................. 375/279; 375/147; 375/316; 375/323; 375/330; 375/340; 375/350

(58) Field of Classification Search .............. 342/30, 342/36, 46, 51; 375/324, 330, 334
See application file for complete search history.

(56) References Cited

U.S. PATENT DOCUMENTS

| | | | |
|---|---|---|---|
| 5,089,822 A | 2/1992 | Abaunza et al. | |
| 5,805,017 A * | 9/1998 | Razzell | 329/300 |
| 6,788,245 B1 * | 9/2004 | Johnson | 342/32 |
| 6,856,274 B1 * | 2/2005 | Johnson | 342/32 |
| 6,895,232 B2 * | 5/2005 | Parker | 455/313 |
| 7,295,607 B2 * | 11/2007 | Yu | 375/238 |
| 7,602,835 B1 * | 10/2009 | Kingston et al. | 375/142 |
| 2003/0142761 A1 * | 7/2003 | Chen | 375/326 |
| 2006/0285612 A1 * | 12/2006 | Tang et al. | 375/330 |
| 2007/0030923 A1 * | 2/2007 | Yu | 375/332 |

FOREIGN PATENT DOCUMENTS

WO    9828839    7/1998

OTHER PUBLICATIONS

Yuce, Mehmet R., et al., "Implementation and Performance of a Low-Power Multirate PSK Receiver Robust to Doppler shift," Vehicular Technology Conference, Sep. 2004, pp. 2230-2235.
European Search Report for Application No. 06126229.1, dated May 22, 2007.

* cited by examiner

*Primary Examiner*—Shuwang Liu
*Assistant Examiner*—Dhaval Patel
(74) *Attorney, Agent, or Firm*—Black Lowe & Graham PLLC

(57) ABSTRACT

An aircraft transponder comprises an antenna for receiving an RF signal a downconverter coupled to the antenna for downconverting the RF signal to an IF signal, an analog-to-digital converter coupled to the downconverter to digitize the IF signal to produce a digital signal, and; a processor unit coupled to the analog-to-digital converter. The processor unit is configured to: (1) generate a delayed digital signal; (2) multiply a delayed digital signal by the digital signal to produce a multiplied output; and (3) filter the multiplied output to produce a filtered output having a positive or negative sign. The transponder further includes a sign converter operable to output a one or zero based on the sign of the filtered output to recover the data component.

16 Claims, 3 Drawing Sheets

DIGITAL DPSK DEMODULATION METHOD AND SYSTEM

TECHNICAL FIELD OF THE INVENTION

This invention relates to the field of signal processing, and more particularly relates to a digital DPSK demodulation method and system.

BACKGROUND OF THE INVENTION

In certain communication systems, data is sent by altering the characteristics of a wave form of a signal, which is generally known as a carrier wave, by some characteristics of a second signal that contains the data to be communicated. This process is known as modulation. Many different types of modulation methods are known. For example, one common modulation technique is amplitude modulation. In amplitude modulation (AM) the amplitude of the carrier wave varies in proportion to the data bearing signal. Another type of modulation is called frequency modulation (FM), which involves altering the instantaneous frequency of the carrier wave based on the amplitude of the data bearing signal. Both AM and FM are considered analog modulation methods since both the carrier wave and the data carrying wave are sinusoidal waves.

In digital communication systems, the carrier wave is modulated by a digital signal. Many different types of modulation techniques for digital communication exist. One type of modulation is phase shift keying modulation (PSK). Modulation of the phase of the carrier wave is varied to convey information. Another type of digital modulation is differential phase-shift-keying (DSPK), in which the modulating signal is not the binary code of the digital signal but a code that records changes in the binary code of the digital signal. Therefore, the demodulator only needs to determine changes in the incoming signal phase.

DPSK modulation is used to modulate data transmissions from ground stations to aircrafts using the Mode-S air traffic surveillance system. In a Mode-S system, a ground station sends out an "All Call" interrogation signal to aircraft in the ground station's coverage area. An aircraft with a Mode-S transponder receives the interrogation from the ground station, and sends a reply that includes a unique identifier of the aircraft. Once the ground station records the unique identifier, the ground station is able to directly communicate with the replying aircraft.

The DPSK encoded carrier wave is received by the aircraft radio and decoded by an on board demodulator. Typical aircraft demodulators are analog devices that include analog delay lines, phase detectors, amplified comparators and other components to demodulate the received carrier wave. The use of analog components increases the size, complexity, and cost of a demodulator.

In view of the foregoing, it is desirable to provide a digital DPSK demodulation method that addresses one or more of the foregoing deficiencies or other deficiencies not implicitly or expressly described. It is also desirable to provide a system for determining a digital DPSK demodulation that addresses one or more of the foregoing deficiencies or other deficiencies not implicitly or expressly described. Furthermore, other desirable factors and characteristics of the present invention will become apparent from the subsequent detailed description and the appended claims, taken in conjunction with the accompanying drawings and the foregoing technical field and background.

SUMMARY OF THE INVENTION

An aircraft transponder comprises an antenna for receiving a radio frequency (RF) signal, a downconverter coupled to the antenna for downconverting the RF signal to an intermediate frequency (IF) signal, and an analog-to-digital converter coupled to the downconverter to digitize the IF signal to produce a digital signal. A processor unit is coupled to the analog-to-digital converter and is configured to: (1) generate a delayed digital signal; (2) multiply a delayed digital signal by the digital signal to produce a multiplied output; and (3) filter the multiplied output to produce a filtered output having a positive or negative sign. The transponder further comprises a sign converter operable to output a one or zero based on the sign of the filtered output to recover the data component.

In another embodiment, a DPSK demodulator comprises an analog-to-digital converter configured to produce a digital signal from an IF signal. The DPSK demodulator also includes a processing unit coupled to the analog-to-digital converter, the processing unit configured to: (1) generate a delayed digital signal; (2) multiply the delayed digital signal by the digital signal to produce a multiplied output; and (3) produce a filtered output having a positive or negative sign. The demodulator also includes a sign converter operable to output a one or zero based on the sign of the filtered output.

In yet another embodiment, a method for demodulating a RF signal having a data component comprises receiving the RF signal and downconverting the RF signal to an IF signal. The IF signal is then digitized to form a digital signal and a delayed digital signal path is generated and multiplied by the digital signal to form a multiplied output. The multiplied output is then filtered to form a sequence of negative and positive numbers. The data component is recovered by converting the positive and negative values to a sequence of ones and zeros.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures:

DETAILED DESCRIPTION OF THE DRAWINGS

The following detailed description is merely illustrative in nature and is not intended to limit the invention or the application and uses of the invention. Furthermore, there is no intention to be bound by any expressed or implied theory presented in the preceding technical field, background, brief summary or the following detailed description.

Figure 1:
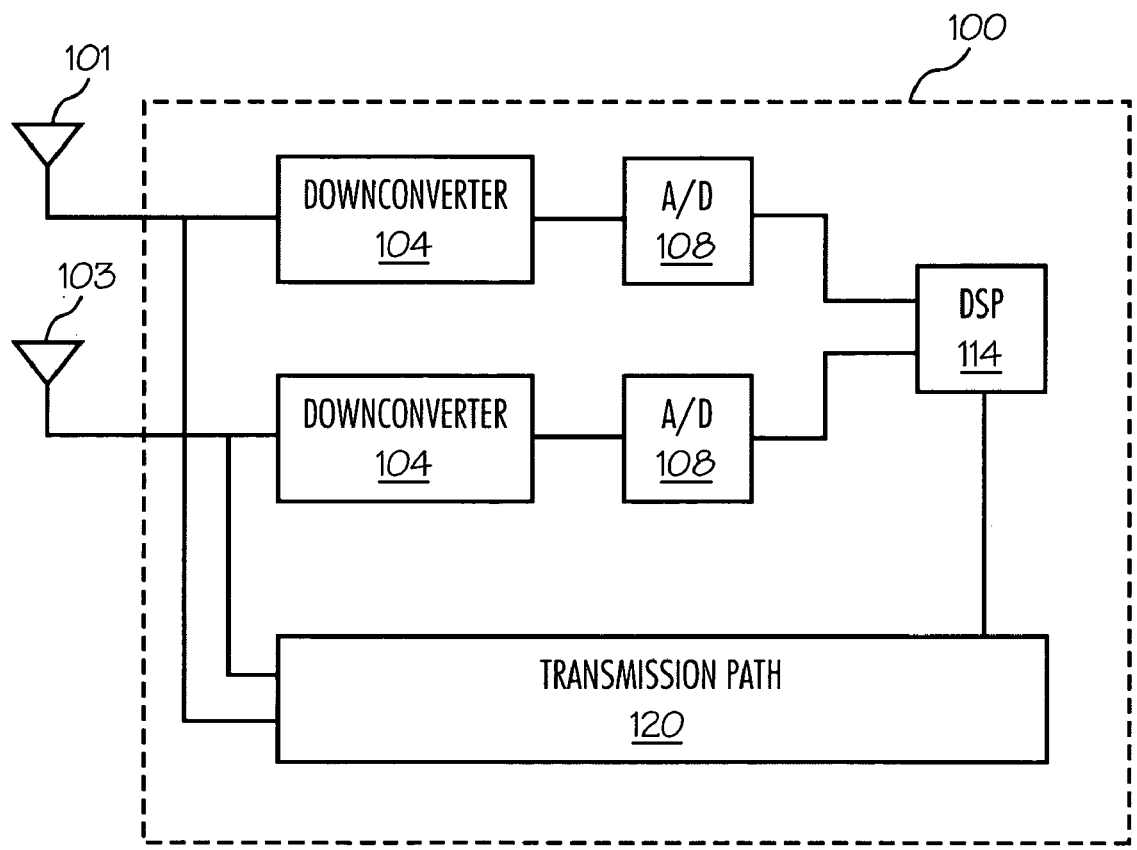
FIG. 1 is a transponder in accordance with an exemplary embodiment of the present invention.

An exemplary transponder 100 is illustrated in FIG. 1. In an exemplary embodiment, the transponder 100 is a Mode-S transponder for use in an aircraft and configured to receive radio frequency signals at about 1030 MHz and send signals at about 1090 MHz. Transponder 100 receives signals from both a top antenna 101, located on top of the aircraft, and a bottom antenna 103, located on the bottom of the aircraft. Both of the antennas (101, 103) are coupled to the transponder 100 that receives signals from both antennas and determines which antenna's signal to process based on factors such as signal strength. Since there are two antennas, transponder 100 has two receive paths. Since the receive paths for both of the antennas (101, 103) are at least substantially similar and generally substantially identical except for which antenna is coupled to the receive path, only one of the antennas will be thoroughly discussed in this detailed description. Transponder 100 also includes a transmission path 120 that is not used in the present invention.

Transponder 100 comprises a downconverter 104 that is coupled to one of the antennas (101, 103). Downconverter 104 is coupled to an analog-to-digital converter 108 that in turn is coupled to a digital signal processing unit 114. Downconverter 104 receives a RF signal from the antenna (101) and downconverts the signal to an IF signal for further processing. In an exemplary embodiment, the RF signal is about a 1030 MHz signal that is downconverted to an intermediate frequency of about 60 MHz. Designs for downconverters are well known in the art.

After the signal is downconverted by the downconverter 104, the IF signal is digitized with analog-to-digital converter 108 to form a digital signal. Typically, the sampling of analog signals is done at or above the Nyquist sampling rate, which is twice the bandwidth of the analog signal. This approach typically requires the use of various filters before and after the analog-to-digital converter. In an exemplary embodiment of the present invention, the IF signal is undersampled at ⅘ of the IF signal. The undersampling rate in this exemplary embodiment can be chosen, at least in part, by careful analysis of the signal spectrum and aliasing effect caused by undersampling. By careful selection of an amount of undersampling, the resultant digital signal can be processed using a simple architecture. In one exemplary embodiment, undersampling can be use in when the bandwidth of the signal of interest is well known and any aliasing effects are mitigated. In an example embodiment, the signal bandwidth is 8 MHz riding on a IF carrier of 60 MHz. By sampling at 48 MHz, the signal will be at baseband and recur at the harmonics of the sampling frequency.

After sampling (or undersampling), the digital signal is then provided to the digital signal processing unit 114 for demodulation. In one exemplary embodiment, digital signal processing unit 114 demodulates the digital signal to recover the original data signal. Digital signal processing unit 114 can be any electronic component capable of demodulating a modulated signal, such as a microprocessor, an ASIC, a field programmable gate array (FPGA) and the like.

Figure 2:
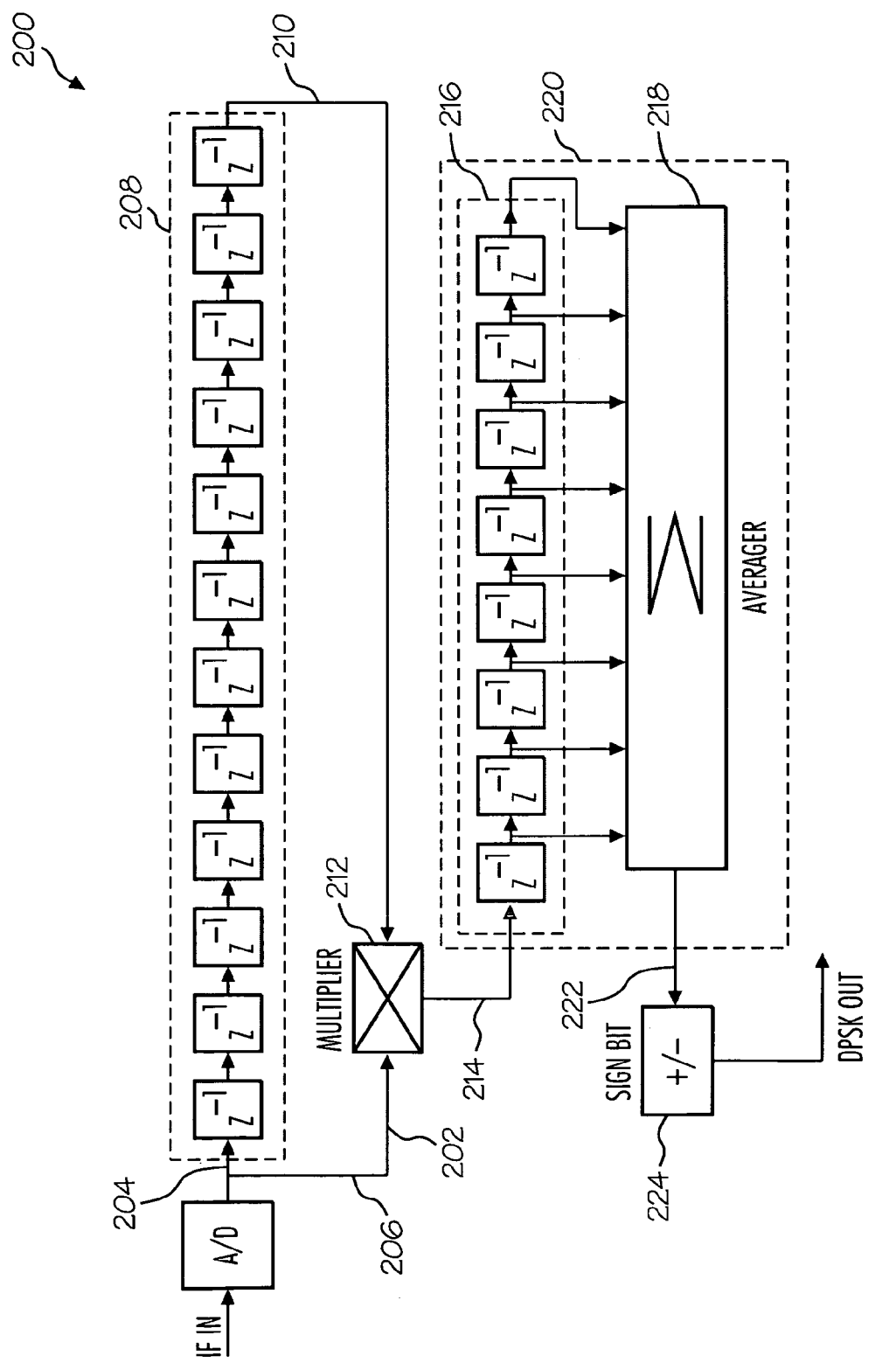
FIG. 2 is a block diagram of a demodulator in accordance with an exemplary embodiment of the present invention.

FIG. 2 illustrates an exemplary block diagram of the demodulator logic 200 of the digital signal processing unit 114 in accordance with an exemplary embodiment of the present invention. As illustrated in FIG. 2, the digital signal 202 generated by the analog-to-digital converter 108 splits into a delay path 204 and a non-delay path 206. The delay path has a number of unit delays 208 through which the digital signal 202 passes to produce a delay output 210. In a typical embodiment, the number of unit delays used corresponds to a one bit data delay. The exact number of unit delays 208 used in the delay path 204 is based, at least in part, on the frequency of the DPSK encoded signal and the frequency of the digital signal. In one exemplary embodiment, the ground station sends about a 4 MHz data signal and the downconverter 104 downconverts the RF signal to an IF signal of about 60 MHz. In the exemplary embodiment, the A/D converter sample rate is set at ⅘ of the IF signal, which is 48 MHz for an IF signal of 60 MHz. Therefore, in the exemplary embodiment twelve delays are used for a 48 MHz digitized signal and a 4 MHz DPSK signal.

The delay output 210 and the digital signal 202 from the non-delay path 206 are multiplied at multiplier 212. The product of the delayed signal 210 and the digitized signal 202 is a multiplied output 214. In one exemplary embodiment, the multiplied output 214 comprises a waveform having a frequency that is the product of the frequency of the digitized signal 202, the delay signal 210, and a DC component. The multiplied output 214 is then transmitted to a series of delays 216 and an averager 218. The combination of the series of delays 216 and the averager 218 forms a low pass filter 220 that filters the waveform, leaving the DC component as a filtered output 222. The filtered output 222 of the low pass filter 220 has either a positive or negative sign. The sign is used by a sign converter 224 that generates a one for positive values of the filtered output or a zero for negative values of the filtered output. However, the sign converter 224 can be configured to generate a one for negative values and a zero for positive values. The ones and zeros represent the demodulated DPSK signal.

In one exemplary embodiment of the present invention, the averager 218 is a summer which adds the series of delays 216. Other implementations of such an averager require the use of additional components, such as dividers. The present invention provides a more efficient and simpler demodulation scheme.

Figure 3:
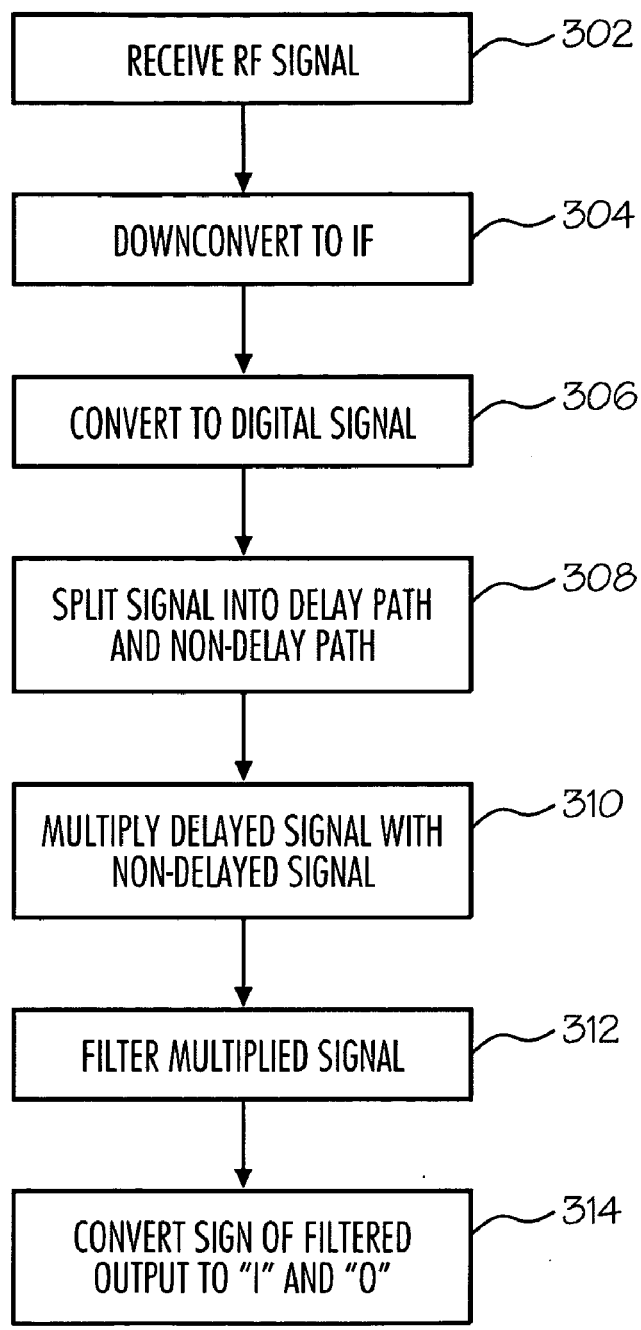
FIG. 3 is a flowchart illustrating an exemplary method for demodulating a DPSK signal in accordance with an exemplary embodiment of the present invention.

FIG. 3 is a flowchart illustrating an exemplary method for demodulating a DPSK signal that can be conducted with the apparatus previously described with other means. In a first step, step 302, a Mode-S data transmission is received at the transponder 100 from a source that in this exemplary embodiment is a ground station. In step, 304, the received RF signal is downconverted to an IF signal at downconverter 104. The IF signal is then converted to a digital signal by the analog-to-digital converter 108 in step 306. As discussed previously, in one exemplary embodiment, analog-to-digital converter 108 undersamples the 60 MHz IF signal to a 48 MHz digital signal.

Next, in step 308, the digital signal follows a delay path and a non-delay path. The digital signal from the non-delay path is multiplied by the delayed digital signal from the delay path (in step 310) to provide a multiplied output. The multiplied output is, in step 312, received by a set of serially connected delays, with each delay coupled to an averager. The set of delays and the averager act as a low pass filter that generates a value that is either positive or negative. In step 314, a sign converter generates a one if the DC component is positive or a zero if the DC component is negative.

The exemplary embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention as set forth in the appended claims and the legal equivalents thereof.

What is claimed:

1. An aircraft transponder comprising:
   an antenna for receiving a radio frequency (RF) signal including a carrier wave modulated with a data component using differential phase-shift-keying (DPSK) modulation;
   a downconverter coupled to the antenna for downconverting the RF signal to an intermediate frequency (IF) signal;
   an analog-to-digital converter coupled to the downconverter to undersample the IF signal at 4/5 of a frequency of the IF signal to produce a digital signal;
   a first plurality of delays coupled to an output of the analog-to-digital converter, the first plurality of delays configured to generate a delayed output signal based upon the digital signal received from the analog-to-digital converter;
   a multiplier configured to receive the output of the analog-to-digital converter and to receive the delayed output signal from the first plurality of delays, and configured to output a multiplied output signal corresponding to a product of the output of the analog-to-digital converter and the delay output signal from the first plurality of delays;
   a second plurality of delays configured to receive the multiplied output signal from the multiplier, wherein each of the second plurality of delays are connected in series;
   an averager configured to receive an output from each of the second plurality of delays, and configured to output a filtered output signal, wherein the filtered output signal is defined by one of a positive sign and a negative sign; and
   a sign converter configured to receive the filtered output signal from the averager, and configured to output a demodulated DPSK signal defined by one of a one and a zero based on the sign of the filtered output signal,
   wherein the demodulated signal is used to recover the data component.

2. The transponder of claim 1 wherein the transponder is a Mode-S transponder.

3. The transponder of claim 1 wherein the first plurality of delays, the multiplier, the second plurality of delays and the averager is implemented as a FPGA processing unit.

4. The transponder of claim 1 wherein the first plurality of delays is further configured to generate the delayed output signal by passing the digital signal received from the analog-to-digital converter through twelve unit delays.

5. The transponder of claim 1 wherein the multiplied output signal is filtered by summing the output of the second plurality of delays.

6. The transponder of claim 4 wherein the twelve unit delays delay the intermediate frequency signal of 60 MHz undersampled to a 48 MHz digital signal.

7. A differential phase-shift-keying (DPSK) demodulator comprising:
   an analog-to-digital converter configured to produce a digital signal from an IF signal at an undersample of the IF signal at 4/5 of a frequency of the IF signal;
   a processing unit coupled to the analog-to-digital converter, the processing unit comprising:
      a first plurality of delays coupled to an output of the analog-to-digital converter, the first plurality of delays configured to generate a delayed output signal based upon the digital signal received from the analog-to-digital converter;
      a multiplier configured to receive the output of the analog-to-digital converter and to receive the delayed output signal from the first plurality of delays, and configured to output a multiplied output signal corresponding to a product of the output of the analog-to-digital converter and the delay output signal from the first plurality of delays;
      a second plurality of delays configured to receive the multiplied output signal from the multiplier, wherein each of the second plurality of delays are connected in series; and
      an averager configured to receive an output from each of the second plurality of delays, and configured to output a filtered output signal, wherein the filtered output signal is defined by one of a positive sign and a negative sign; and
   a sign converter operable to output a one or zero based on the sign of the filtered output.

8. The demodulator of claim 7 wherein the demodulator is part of a transponder.

9. The demodulator of claim 8 wherein the transponder is a Mode-S transponder.

10. The demodulator of claim 7 wherein the processing unit is a FPGA.

11. The demodulator of claim 7 wherein the first plurality of delays comprises a plurality of twelve unit delays.

12. The demodulator of claim 11 wherein the digital signal is passed through the twelve delays when the intermediate frequency of 60 MHz is undersampled to a 48 MHz digital signal.

13. The demodulator of claim 7 wherein the multiplied output is filtered by averaging the output of a plurality of serially connected delays.

14. A method for demodulating an RF signal including a DPSK modulated data component signal comprising:
   receiving the RF signal at a downconverter;
   downconverting the RF signal to an IF signal using the downconverter;
   digitizing the IF signal received from the downconverter to form a digital signal using an analog-to-digital converter;
   communicating the digital signal to a first plurality of delays and to a multiplier;
   generating a delayed digital signal corresponding to an undersample of the IF signal at 4/5 of a frequency of the IF signal using the first plurality of delays;
   communicating the delayed digital signal to the multiplier;
   multiplying the delayed digital signal by the digital signal using the multiplier, wherein the multiplier outputs a multiplied output;
   communicating the multiplied output to a second plurality of delays connected in series;
   averaging the outputs of the series connected second plurality of delays using an averager;
   communicating an output of the averager to a sign converter;
   forming a filtered output comprising a sequence of negative and positive values by filtering the multiplied output using the sign converter; and
   recovering the data component by converting the positive and negative values to a sequence of ones and zeros.

15. The method of claim 14 wherein the step of receiving an RF signal further comprises receiving an RF signal from a Mode S transponder.

16. The method of claim 14 wherein the step of generating a delayed digital signal further comprises generating a delayed digital signal by passing the digital signal through a plurality of twelve unit delays.

* * * * *